L. WIRTZ.
CHAIN.
APPLICATION FILED MAR. 17, 1916.

1,233,534.

Patented July 17, 1917.
2 SHEETS—SHEET 1.

Inventor
Luis Wirtz
By B. Singer
Atty

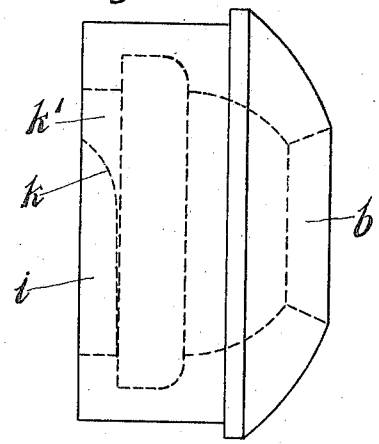
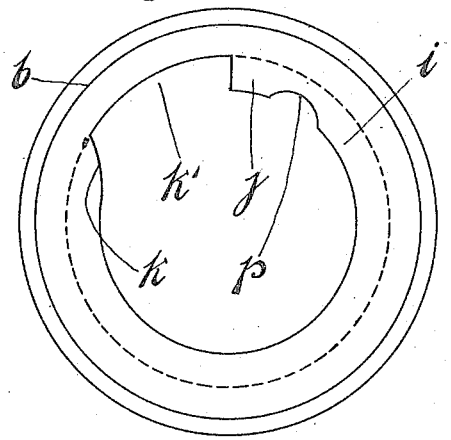
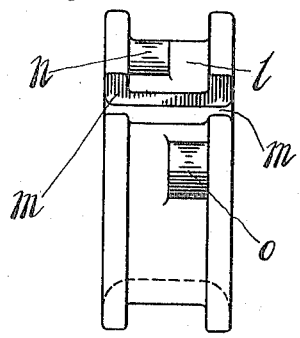
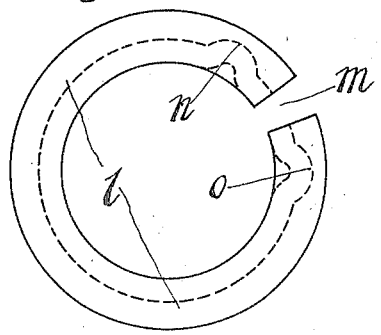
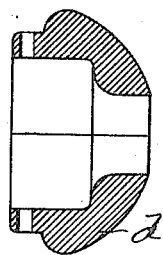
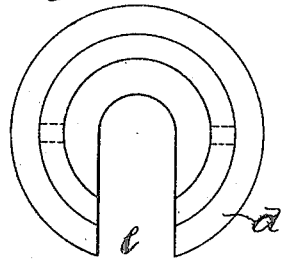

UNITED STATES PATENT OFFICE.

LUIS WIRTZ, OF EDGBASTON, BIRMINGHAM, ENGLAND.

CHAIN.

1,233,534. Specification of Letters Patent. Patented July 17, 1917.

Application filed March 17, 1916. Serial No. 84,826.

*To all whom it may concern:*

Be it known that I, LUIS WIRTZ, subject of the King of Great Britain, residing at Richmond House, Poplar avenue, Edgbaston, Birmingham, in the county of Warwick, England, have invented certain new and useful Improvements in Chains, of which the following is a specification.

This invention comprises improvements in chains and refers to the type in which hollow links and shank like links are connected by universal or ball joints, so that the links may rotate or twist relatively to each other.

The object of the invention is to enable chains of this type to be constructed in a practical manner giving strength combined with smoothness and freedom in working with absence of small parts like bolts, nuts, etc., to keep the parts together.

The hollow links are preferably cylindrical with chamfered or rounded ends. In accordance with the invention the hollow links are formed in two parts having internal flanges or ridges, which are embraced by a troughed coupling member. In the preferred form the coupling member is split and acts as a spring, the faces of the flanges or ridges engaged by it preferably being slightly helical for the purpose of more easily assembling the parts and enabling the coupling member to act as a spring between the two assembled halves until the said coupling has deflected so as to become parallel to the taper of the helical faces. The flanges or ridges are preferably slit or cut open in order to facilitate the insertion of the coupling member and coacting projections and recesses are provided between the coupling member and the flanges to insure correct positioning.

On the drawings:—

Figure 1:
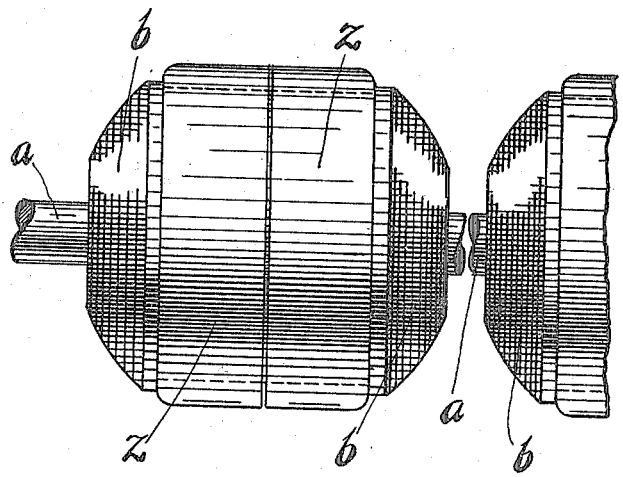

Figure 1. shows a portion of a length of chain constructed in accordance with my invention and drawn to a large scale.

Figure 2:
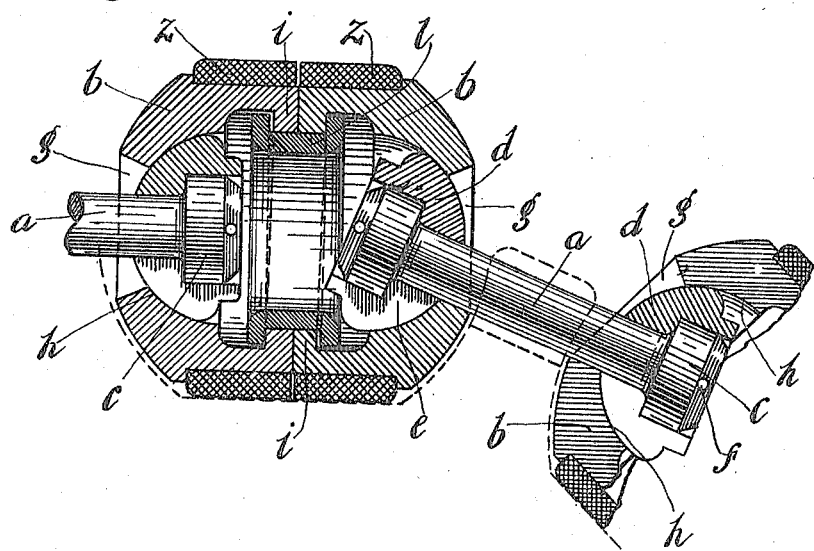

Fig. 2. shows a central vertical section thereof.

Fig. 3. is an elevation of one of the hollow parts that make up the hollow cylindrical links.

Fig. 4. is an end view of Fig. 3. looking from the left.

Fig. 5. is a front elevation of a form of spring coupling member employed within the hollow cylindrical links.

Fig. 6 is an end elevation thereof.

Fig. 7. is a view of the inner face of the bearing portion $d$ seen in section in Fig. 2.

Fig. 8. is a sectional view of such a bearing portion made in a slightly modified manner.

In the construction shown on the drawings the solid links $a$. have a head $c$. at each end and are equipped with the bearing surfaces $d$. which may be mounted upon them by forming the parts $d$. with a U-shaped notch $e$. to permit passing of the shank of the link. A pin $f$. is then inserted through the parts, as in Fig. 2, or the part $d$. may be formed in two halves divided parallel to the axis as in Fig. 8. and secured together when in place on the shank.

The hollow cylindrical links $b$. are formed in two symmetrical parts dividing the link centrally at right angles to the axis. Each part has an aperture $g$. through which the link $a$. works and surrounding the aperture the internal surface of the part is formed as a concave bearing surface $h$. to coöperate with the bearing surface $d$. of a link $a$. At or near the meeting edges of each of the two halves of the link $b$. I form an internal ridge $i$. of sufficient depth to resist the tensile strain to which it is subjected under the conditions hereinafter stated. The thickness of each ridge $i$. in a direction parallel with the axis of each link is greatest at $j$. Fig. 4 and gradually reduced until the part $k$. is reached where a gap $kl$. is formed. The outer surface of the ridge $i$. of each half is entirely in a plane at right angles to the axis and the inner surface or edge is necessarily inclined or helical due to the reduction in thickness of the ridge.

The two halves of the links should be assembled so that the thickest part of the ridge $i$. on one half is near or faces the thinnest part of the ridge of the other half.

To connect the two halves I employ an annular troughed spring $l$. embracing the ridges $i$. of the parts and as the spring is a ring it normally retains the parts of the hollow link tightly together. The spring is split at one point as at $m$. (Fig. 5.) and is further provided with two projections adjacent to the split $m$. one $n$. on the left and the other $o$. to the right of the central plane as shown in Fig. 5. Similarly the ridges $i$. are provided in their thickest parts with indentations $p$. to receive the projections $n$. $o$. of the spring.

The coupling member engaging the ridges

*i*. need not be a spring unless a degree of elasticity is needed for the chain.

When the chain is assembled and not subject to strain the combined ridge of the two halves of the hollow link *b*. will be engaged within the trough of the spring *l* and the above mentioned projections *n*. *o*. and indentations *p*. will be engaged but the bearing of the helical or inclined surfaces of the ridges on the walls of the trough of the spring, owing to their formation, will be only along a small portion of each half link.

Consequently, if any strain comes upon the chain the spring ends will open out, one end moving to the right and the other to the left so that the spring tends to assume what may be termed a slight V shape which causes the contact between its sides and the inclined or helical surfaces of the ridges *i*. to increase until finally the inclination of the sides of the spring and the surfaces of the ridges correspond, contact occurring all around the ridges and the spring becoming a rigid connecting member between the two halves of the link *b*. By increasing the inclination of the ridges *i*. and the flexibility of the spring the elasticity of the chain can be increased as desired.

In assembling the chain, taking one half of a hollow link *b*. the solid link *a*. without its spherical bearing *d*. is passed through the hole of the hollow link *b*.; the spherical bearing *d*. is then slipped into position and the split pin *f*. fitted in place. The connecting spring *l*. is then placed so that the end which is farthest from the projection *n* or *o* to be engaged is first inserted in the gap *kl*. left in the ridge *i*. and is then turned 300 degrees approximately until the projection drops on to the corresponding indentation *p* of the ridge. Another half hollow link into which a second shank link *a*. will have been similarly inserted is now placed in contact with the projecting half of the connecting spring *l*. so that its gap and thinnest part of the ridge faces the loose end of the spring farthest from the projection of the latter, and is then twisted around about 300° until the projection of the spring falls into its corresponding indentation in the half link.

The hollow links *b*. may each be provided with a surrounding jacket or cover *z*. of leather, fiber, rubber, or any other suitable material with the object of enhancing the grip if the chain is used in a pulley without teeth or with the object of rendering the working as silent and as smooth as possible.

The advantages of the improved chain are:—(1) The ease of manufacture. (2) The absence of small parts, bolts, nuts, or cotters, in the assembling of the parts. (3) The facility with which by altering the taper on the flanges the elasticity of the chain can be varied between very considerable limits. (4) The chain may be used for positive drives over sprockets or for friction drives in grooves of pulleys or both together. (5) The chains may drive from a small sprocket to a large pulley, or from a small pulley to a large one and as toothed members may be used with them they may be used in plurality side by side for heavy drives and when both driving and driven member are pulleys a sprocket may be used as a jockey and insure their working together. (6) The hollow links serve to contain lubricant, and as the bearing surfaces are inclosed, the working surfaces may work in lubricant. (7) The hollow link being cylindrical on the outside can be encircled by a ring of leather, rubber or suitable material so as to increase its grip on the flanges of an ordinary rope pulley.

It will be observed that the curved end surfaces of the hollow links and the space between them occupied by the shank links enables the introduction of a tooth or projection between the hollow links so that the chain is adapted for use for positive drives or sprockets. The tooth or projection will preferably be of a height to extend so far as or beyond the axis of the connecting shank link and in that case should be recessed at the center to accommodate the shank link. At Fig. 1. teeth of a toothed sprocket are indicated in dotted lines to show the relative position to the chain when in use.

In the foregoing description where the shank links *a*, are referred to as solid links and while I prefer this construction, it is not intended to limit the ambit of the invention to such a formation. Similarly where the "split" spring *l* is described I mean that the spring should be weakened at one definite point so as to "give" or "flex" there when desired and any other construction enabling this effect to be obtained may be followed.

The hollow links may have projections on them for mounting conveyer buckets or bars and more than one chain may be used for this purpose arranged in parallel planes and connected by transverse conveyer members,—but in this case only the shank links are free to turn or twist.

What I claim is:

1. An improved chain comprising in combination hollow links, shank links connecting said hollow links, said hollow links being in two parts and having flanges at or near their meeting portions, and internal coupling members engaging said flanges.

2. An improved chain comprising in combination hollow links, shank links connecting said hollow links, said hollow links being in two cylindrical parts and having internal projections at or near their meeting portions, and internal coupling members engaging said projections and adapted to yield slightly under strain.

3. An improved chain comprising in combination hollow links, shank links connecting said hollow links, said hollow links being in two cylindrical parts and having internal projections, and troughed spring coupling members engaging said projections, the surfaces of said internal projections being inclined.

4. An improved chain comprising in combination hollow links, shank links connecting said hollow links, said hollow links being in two cylindrical parts and having internal flanges, and troughed coupling members for engaging said flanges, each of said flanges having one side surface inclined and each having a gap formed in it and a recess, each coupling member being split and having two projections one on each side of the split and in different planes, so that one projection may engage the aforesaid recess in one of said flanges and the other projection may engage the recess in the adjacent flange.

5. An improved chain comprising in combination hollow links, shank links connecting said hollow links, said hollow links comprising two cylindrical parts each having an internal flange, and internal troughed coupling members engaging said flanges for connecting the parts of the hollow links, each of said cylindrical parts having an internal bearing surface and said shank links having bearing surfaces engaging the bearing surfaces of said hollow links.

6. An improved chain comprising hollow links, shank links connecting said hollow links, said hollow links comprising two cylindrical parts each having an internal flange, internal troughed coupling members for uniting said cylindrical parts, each of said parts having an internal bearing surface, and elements on said shank links provided with bearing surfaces engaging said bearing surfaces of said parts, said elements having the bearing surfaces being formed separately from the shank links and connected thereto.

7. An improved chain comprising in combination hollow links, shank links connecting said hollow links, said hollow links being in two parts and having flanges at or near their meeting portions, internal coupling members engaging said flanges, and external covering portions for said hollow links of suitable material for increasing their gripping properties.

In testimony whereof I affix my signature in presence of two witnesses.

LUIS WIRTZ.

Witnesses:
C. F. H. WHITEHOUSE,
M. FOX.

Copies of this patent may be obtained for five cents each, by addressing the "Commissioner of Patents, Washington, D. C."